United States Patent [19]

Greuel, Jr. et al.

[11] 3,957,382

[45] May 18, 1976

[54] METHOD OF PROCESSING FUSIBLE INSERTS

[75] Inventors: Walter J. Greuel, Jr., Oakland; Stephen H. Diaz, Los Altos, both of Calif.

[73] Assignee: Raychem Corporation, Menlo Park, Calif.

[22] Filed: June 11, 1974

[21] Appl. No.: 478,308

Related U.S. Application Data

[63] Continuation-in-part of Ser. No. 368,671, June 11, 1973, abandoned.

[52] U.S. Cl. .................................. 403/27; 156/86; 156/155; 264/230; 264/317; 285/381; 285/DIG. 10; 403/270
[51] Int. Cl. ........................................... B29c 27/00
[58] Field of Search .............. 403/27, 270, 28, 265, 403/300; 285/DIG. 10, 381, 21, 423, 93; 264/230, 317, DIG. 44; 156/86, 64, 155

[56] References Cited
UNITED STATES PATENTS

| | | | |
|---|---|---|---|
| 3,243,211 | 3/1966 | Wetmore | 285/DIG. 10 X |
| 3,315,986 | 4/1967 | Quick | 285/381 X |
| 3,415,287 | 12/1968 | Heslop et al. | 285/381 X |

*Primary Examiner*—H. Hampton Hunter
*Attorney, Agent, or Firm*—Lyon and Lyon

[57] ABSTRACT

A fusible insert having protuberances on at least one surface is disposed between a heat recoverable sleeve and the substrate over which the sleeve is recovered. The protuberances provide for mechanical engagement between the liner and the sleeve or substrate. When the protuberance has substantially the same melting temperature as the liner and the sleeve has been recovered but insufficient heat added to make the insert flowable, the protuberances form detectable bumps on the outer surface of the sleeve indicating that more heat should be added to render the insert flowable.

10 Claims, 8 Drawing Figures

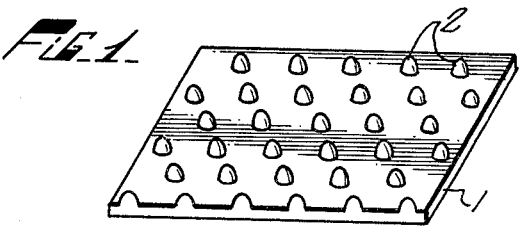
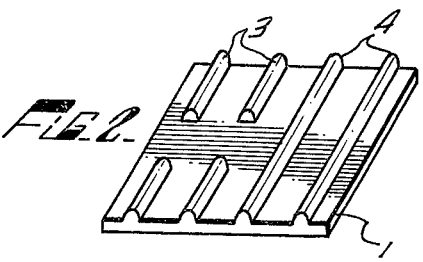
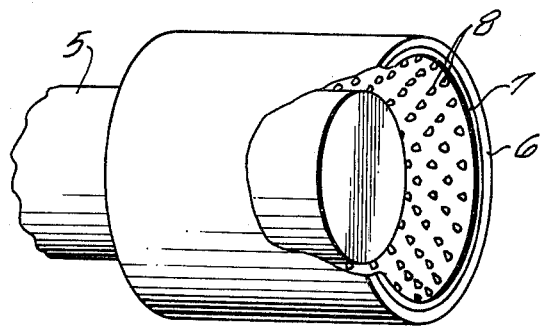
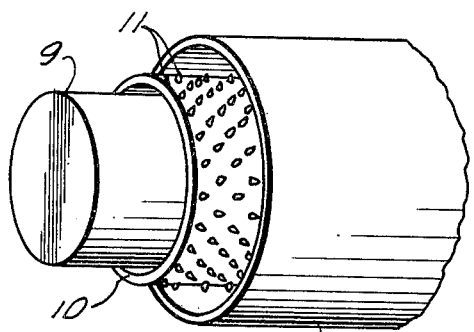
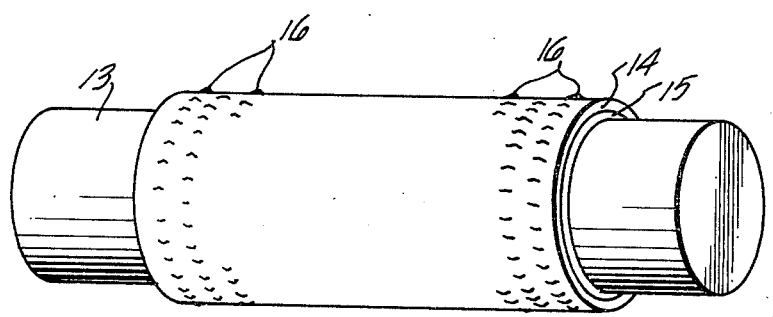
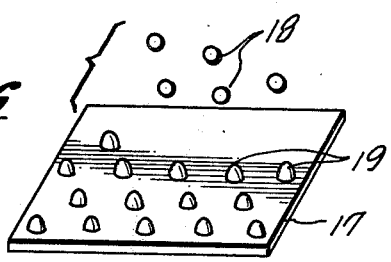
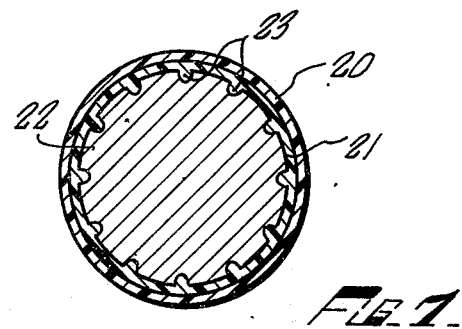
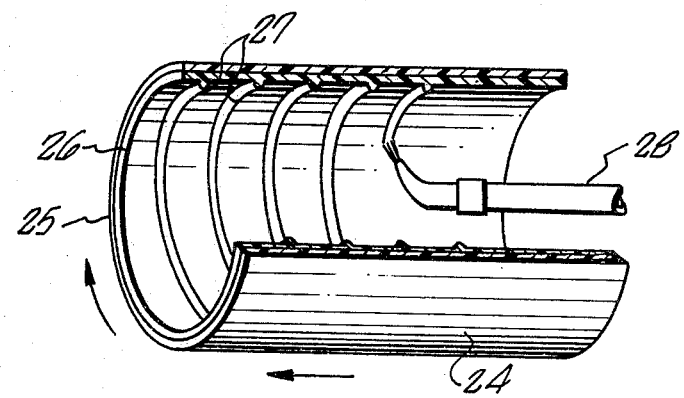

METHOD OF PROCESSING FUSIBLE INSERTS

This is a continuation-in-part of our copending application Ser. No. 368,671, filed June 11, 1973, and entitled METHOD OF PROCESSING FUSIBLE INSERTS, now abandoned.

BACKGROUND OF THE INVENTION

It has long been known that recoverable articles are useful for covering, protecting and/or encapsulating other articles. For example, elastomer sleeves have often been used to cover cylindrical articles merely by choosing a sleeve which, in its relaxed condition, has a diameter less than that of the article to be covered. The tendency of the elastic sleeve to retract when it has been expanded and placed over the article results in a covering for the article which, for some few purposes, is satisfactory. Heat recoverable encapsulating articles have been used in a somewhat similar manner and generally found superior to elastomer covers in many applications. However, many of the heat recoverable encapsulating articles known to the prior art have not been completely satisfactory particularly under circumstances where a strong and impervious bond between the recoverable article and the workpiece which is to be covered is desired. For example, it is common practice to laminate an insulating covering over electrical components such as conductors. The insulating material must, of course, be securely bonded to the conductor in order to protect the conductor from water or air or other media with which it may come into contact. Furthermore, it is also highly important that there be no air spaces between the convering and the conductor. The occurrence of air spaces is particularly troublesome where the insulating material is applied to an element having an irregular surface, such as a plurality of wires which have been twisted together to form a cable or braided structure. Thus, as is well-known to those skilled in the art, there has been a long standing need for heat recoverable coverings which are easy to apply, and yet are capable of forming a secure, intimate, impervious bond with the article which is covered.

U.S. Pat. Nos. 3,243,211 and 3,396,460 advanced the art when they taught a means of providing a heat recoverable article capable of being laminated to another article in such a manner that a secure, intimate and impervious bond was formed. Copending, commonly assigned application Ser. No. 129,919, filed Mar. 31, 1971, and now abandoned teaches the use of heat recoverable sleeves to repair breaks in mine cables. The disclosures of said patents and said applications are incorporated herein by reference to avoid unnecessary enlargement of the instant specification by the inclusion of an extensive discussion of the known prior art. This prior art teaches, inter alia, a heat recoverable, hollow article provided with a fusible insert, i.e., liner. The terms "insert" or "liner" as used hereinafter contemplate any fusible member which is positioned such that it will be interposed between the recoverable encapsulating member and the article, i.e., substrate, which the recoverable member is to encapsulate. The term fusible liner, for the purposes of this application shall include both liners of material that have a definite fusing point and materials that simply become more flowable as their temperature is increased. The words "sleeve" or "jacket" will, for convenience sake, be used hereinafter to describe any hollow, heat-recoverable encapsulating member. The prior art has found that an essentially abutting relation of the liner with both the recoverable sleeve and the substrate article to which the recoverable sleeve is to be united as preferred. Under these circumstances a heat induced change, i.e., recovery, of the recoverable member will urge the finish member toward the substrate and bring it into compressive abutment therewith.

However, to achieve a secure, intimate and impervious bond between the sleeve and the substrate the interposed fusible member must become "fluid", i.e., be reduced in viscosity to an extent sufficient that it flows and "wets" the opposing surfaces of the substrate and of the recoverable member and thereby forms a bond therebetween. A material is said to flow or be flowable if it has substantially no stability of form under the pressure exerted on it by the recoverable member. The term fusible material includes materials showing a sharp drop in viscosity over a relatively narrow range of temperatures. However, it should be understood that materials which exhibit a gradual decrease in viscosity over a large temperature range may be used in the same manner as fusible materials in accordance with this invention. With polymeric substances the term "flow temperature" therefore connotes the temperature at which the polymer has a sufficiently low viscosity to wet surfaces it contacts. With substantially crystalline polymers this flow temperature approximately corresponds to the polymer melting point and this latter term shall be used hereinafter to connote the flow temperature of both crystalline and non-crystalline polymers. Thus to achieve a good bond sufficient heat should always be applied to the fusible insert, i.e., liner, to raise it above its melting point. Under these circumstances where the recoverable sleeve is thin and its heat recovery temperature substantially greater than the melting point of the fusible liner this is readily achieved. However, frequently when thick recoverable sleeves and/or comparatively high melting fusible inserts are used, an unskilled worker will not apply sufficient heat to fully melt the fusible liner. This is, of course, highly undesirable since the liner will then not fully wet the surfaces of both the substrate and the sleeve and a sufficiently secure, intimate and impervious bond may not be formed therebetween.

DESCRIPTION OF THE INVENTION

It is an object of this invention to provide a composite structure comprising a hollow heat recoverable sleeve and a fusible liner and a method of using same whereby even the most unskilled applicator will be certain that sufficient heat has been applied to fully melt the fusible liner and thereby bond said recoverable sleeve to any workpiece telescoped within same.

It is a further object of this invention to provide a means whereby simple visual and/or tactile examination of the workpiece after heating of the aforementioned composite structure to encapsulate said workpiece will be sufficient to determine if sufficient heat has been applied to melt the fusible liner.

The manner of achieving these and other useful objectives will be made apparent by the following detailed description of the invention taken in conjunction with the accompanying drawings wherein:

FIGS. 1 and 2 are enlarged, fragmentary, perspective views of a fusible liner according to this invention.

FIG. 3 is a perspective view of recoverable sleeve, fusible liner and substrate.

FIG. 4 is a perspective view of a substrate covered by a fusible liner and a recoverable sleeve.

FIG. 5 is a perspective view illustrating bumps visible through the sleeve when the liner has not been heated sufficiently to flow.

FIG. 6 is a perspective view illustrating a method of making the fusible liner of this invention.

FIG. 7 is an end view of a sleeve and liner illustrating embossing of the liner.

FIG. 8 is a perspective view illustrating forming a liner having helical ridges.

Although the following discussion will be directed primarily towards heat recoverable members, i.e., sleeves, of tubular form, it should be understood that the present invention is equally applicable to and therefore encompasses structures wherein the recoverable member is in the form of an end cap, i.e., cup, T, X, or Y, rings or any other hollow configuration having at least one open end into which a substrate workpiece can telescope.

It has now been discovered in accordance with the instant invention that these and other objectives are achieved if there is present on the surface of the fusible liner a plurality of separate upstanding protuberances formed from either the same material as the fusible liner or other compatible material as hereinafter defined. These protuberances can in most instances suitably be present on either or on both surfaces of the fusible liner, i.e., the surface disposed towards the substrate or the surface disposed towards the jacket, or both. If the heat applied to effect recovery of the heat recoverable sleeve is sufficient to also melt the fusible liner, then the protuberances will melt and the recovered composite will present a smooth outer surface, i.e., the outer surface of the encapsulating sleeve will be smooth. Conversely, if sufficient heat is supplied to effect recovery of the recoverable jacket member, but insufficient to fully melt the fusible liner, then the protuberances on the liner will not melt and will form corresponding bulges showing on the surface of the recovered jacket. Even under conditions of poor visibility, such bulges can readily be felt by running the hand over the jacket. The heating hereinabove referred to as being required to effect recovery of the heat recoverable jacket and melting of the fusible insert may be by any positive application of heat, e.g., radiation heating, induction heating, electric resistance heating, heat generated by an exothermic reaction, etc.

The number, form and manner of disposition of the protuberances is not critical provided the basic objective of the invention is adhered to. With respect to number, obviously if only a very limited number of protuberances are present, the operator after recovery will be less certain that all the fusible liner, including the areas thereof which are furthest from any protuberances has been sufficiently heated. It is therefore apparent that sufficient protuberances should preferably be present so that their disappearance on heating is a clear indication that all of the fusible liner has been melted. Likewise, to achieve this objective the protuberances should be distributed over substantially the entire surface of the fusible liner. Such distribution can be random or in any conceivable geometric pattern. With respect to the form of the protuberances, they can be either separate, i.e., bumps or pimples, or in the form of continuous or discontinuous lines, i.e., ridges. Preferably such bumps or ridges will be sharp sided and relatively high in proportion to their cross-sectional area so that if they are not fully melted they will form readily apparent corresponding bumps or ridges on the outer surface of the recoverable member. Thus it is preferable that the height of the proturberances is equal to at least about the diameter of the base of the protuberance. It is further preferred that the height of the protuberance be at least about equal to the thickness of the recovered sleeve with which it is associated. Obviously, the most appropriate number and form of the protuberances will vary with the thickness and shape of the recoverable member and the contemplated heating means and for any given type of recoverable member can be readily determined by a few simple experiments.

The protuberance may be formed on the insert by providing a corrugated insert. Thus the peaks of the corrugatious which contact the sleeve would constitute the protuberance. Further, as the insert begins to melt the peaks in contact with the sleeve may melt prior to the peaks in contact with the substrate. At that point the lumps formed by the unmelted peaks in contact with the substrate form lumps which function as protuberances.

The fusible insert can be functionally combined with the heat recoverable sleeve in any suitable manner. For example, the fusible material will ordinarily be applied to either the recoverable sleeve member or to the substrate member as a coating thereon with the protuberances being disposed on either or both surfaces of the insert. For example, the fusible insert can be coated on the inner surface of the heat recoverable sleeve, i.e., the surface which is disposed towards a substrate telescoped therewithin, the outer surface or both. Normally, the protuberances will be present on the surface of the fusible insert which is not bonded to the heat shrinkable sleeve and will therefore be disposed towards the substrate. Conversely, if the fusible insert is coated onto the outer surface of the substrate the protuberances will typically be on the other surface of the fusible insert being thereby disposed towards the inner surface of the enveloping sleeve. However, the side containing the protuberance may be readily bonded to the substrate or sleeve, e.g., by bonding the liner at points between the roturberances. Alternatively, the fusible insert in sheet form can first be wrapped around the substrate followed by telescoping the encased substrate within the sleeve. Or, a separate integral tube of fusible insert can be interposed between the substrate and the recoverable encapsulating sleeve. Under these circumstances the fusible insert can have protuberances present on either or on both of its surfaces, i.e., the surface disposed towards the substrate and/or on the surface disposed towards the jacket.

If the fusible insert is to be coated onto the inner surface of the heat recoverable jacket such coating would, of course, be done subsequent to the deformation of said jacket to its heat recoverable condition. Alternatively, although not preferably, the fusible insert need not coat or envelop the entire outer surface of the substrate or coat the entire inner surface of the jacket but can be deposited on either the substrate or jacket in the form of rings, strips or other discontinous area of fusible material on the substrate outer surface or jacket surface, respectively.

In general, the protuberances will be of the same material as the liner and will have the same melting point as the liner. However, in some cases, it may be desirable to have the protuberances melt at a temperature different from that of the rest of the liner. For example, the protuberances may melt at a temperature higher than the temperature at which the rest of the liner melts or is fusible. In such a case, there would be a heat margin, thus insuring that the rest of the liner had melted when the protuberances disappeared. Further, if the protuberances melt at a temperature higher than the melting temperature of the liner, they might dig into either the substrate or the sleeve or both thus providing for maintenance of good gripping between the liner and substrate, liner and sleeve or all three prior to fusing of the liner. Indeed, the protuberances may be infusible at the heating temperatures so that they remain in contact with the substrate and/or sleeve after the rest of the liner has melted. For this purpose pieces of metal, ceramic, thermosetting plastics, etc., may be employed as protuberances to mechanically engage the sleeve and/or substrate to increase the mechanical strength of the joint. These protuberances may be applied, e.g., by sprinkling them onto the insert.

The protuberances may also melt at a temperature lower than the melting temperature of the liner. Use of such lower melting protuberances may be desirable where timed heating is to occur. For example, when applying sleeves withh fusible liners to cold pipelines, it is desirable to heat the sleeve covering the pipeline for a set period of time after a predetermined temperature has been reached. Thus, if the protuberances are set to melt at the predetermined temperature, timing can be started from that point.

The protuberances may be used for purposes other than to indicate whether fusing of the liner has occurred. Thus, it is sometimes desirable to have a layer of foamed material as a liner for imparting desired dielectric properties. The protuberances may be fusible or hollow and fusible so that they allow sufficient volume for controlled foaming of the balance of the liner. Thus, foaming agents placed in the liner could result in the production of a foam which would occupy, in part, the space originally occupied by the hollow protuberances.

The protuberances on the fusible insert can be formed in a wide variety of ways. The choice is primarily dependent upon whether the fusible insert is to be utilized as a separate sheet or tube or as a coating on the recoverable member, or substrate, as described above. Where a separate sheet or tube of fusible insert is utilized, such a sheet or tube is ordinarily prepared by extrusion. The sheet or tube can ordinarily be extruded using a die shaped to extrude a sheet or tube profile with ridges intergrally formed thereon. Alternatively, a transfer coating apparatus can be used to emboss any desired pattern of protuberances on either or both of the sheet surfaces. A tube, sheet or a coating of fusible insert can be provided with protuberances by sprinkling pellets of the insert material onto the surface of the tube, sheet or coating which will preferably be warmed sufficiently to ensure adherence of the pellets. A tube, interiorly coated, i.e., lined, with fusible insert can be provided with internal ridges, either longitudinal or helical, by passing the line tube over a vertical spray head which telescopes within the tube and sprays molten insert material onto the interior surface of the fusible insert. If the lined tube is simultaneously rotated as it traverses the spray helical ridges are formed. Alternatively an internal rotating spray head can be used to provide a series of ridges on the inside surface of the fusible lining where the tube is stationary and the head rotates and then either the tube or the head is displaced in stages longitudinally. Another method is to partly heat recover the tube with fusible liner onto an engraved mandrel which will thereby emboss any desired pattern of ridges or bumps on the insert inner surface. Under some circumstances, it is desirable to bring the fusible insert to a temperature somewhat higher than its melt temperature. In these cases, the protuberances may be made by sprinkling or otherwise applying, as described above, onto the insert surface protuberances of a material with a melt temperature higher than that of the fusible insert which is compatible with the fusible insert. In some cases, the desired temperature corresponds to the softening temperature of a cable upon which the heat shrinkable jacket is being applied. The term "compatible", as used herein, merely connotes that at the melting point of the higher melting protuberances material, said material will become dissolved or otherwise dispersed into the already melted fusible insert material. In many instances, the melting point or flow temperature of the protuberances is substantially the same as that of the fusible insert so that flowing and elimination of the protuberances indicates flowing of the fusible material.

The recoverable member of the instant invention is ordinarily extruded or molded in the desired shape. Where a simple tubular shape is desired it may also be fabricated from a flat sheet of material simply by rolling it into a tube and suitably sealing the seam. Preferably, the recoverable member comprises a material having the property of elastic memory such as those disclosed in U.S. Pat. No. 3,086,242. As is well-known to those skilled in the art, materials having the property of elastic memory are dimensionally heat unstable and may be caused to change shape and/or dimension simply by the application of heat. Elastic memory may be imparted to polymeric materials by first extruding or otherwise molding the polymer into a desired shape. The polymer is then crosslinked or given the properties of a crosslinked material by exposure to high energy radiation, e.g., a high energy electron beam, exposure to ultraviolet irradiation, or by chemical means, e.g., incorporation of peroxides when polyolefins are used. The crosslinked polymeric material is then heated and deformed and then locked in that deformed condition by quenching or other suitable cooling or, in the alternative, the same process can be accomplished at room temperature by using greater force to deform the polymer. The deformed material will retain its shape almost indefinitely until exposed to an elevated temperature sufficient to cause recovery, e.g., approximately 250°F in the case of polyethylene. Among the polymers which can be so processed are polyolefins such as polyethylene and polypropylene, polyamides, polyurethanes, polyvinylchloride, polytetrafluoroethylene and polyvinylidenefluoride. The property of elastic memory can also be imparted without actual crosslinking to materials having the properties of crosslinked polymers such as polytetrafluoroethylene and polyolefins or vinyl polymers which have a sufficiently high molecular weight to give the polymer appreciable strength at temperatures above the crystalline melting point.

Suitable materials for the fusible insert include conventional thermoplastics such as polyolefins (e.g., polyethylene and polypropylene), polyamides (e.g., Nylon 6, Nylon 66 and the like), polyesters (e.g., polyethylene terephalate), and polyether sulfones (e.g., poly (4,4' phenylene ether sulfone)). Particularly preferred are hot melt adhesives such as those disclosed in copending, commonly assigned application Ser. No. 291,542, filed Sept. 25, 1972, the disclosure of which is incorporated herein by reference. It is to be understood, however, that the present invention is not limited to the use of conventional thermoplastics as the fusible insert and initially flowable thermosetting materials are also suitable. Materials such as epoxy resins, polyurethane resins, phenol-formaldehyde resins and the like may, therefore, also be used either alone or in combination with a thermoplastic to form the fusible insert. In addition other fusible materials such as solder and other metals may be employed.

An understanding of the present invention will be facilitated by a consideration of the accompanying drawings.

FIG. 1 is a perspective view illustrating the fusible liner 1 having protuberances in the form of bumps or pimples. The liner has been illustrated as a sheet which could be wrapped around a substrate. It should be understood that the line could be a tube or any other desired shape. It can be seen that the pimples are sharp and relatively high in relation to their cross-sectional area. Normally, when the fusible liner is placed inside of a recoverable sleeve, the pimples are disposed away from the sleeve. However, if desired, the fusible liner could be inserted into the recoverable sleeve with the pimples disposed toward the sleeve. Also, although only one side of the liner is shown, it could have bumps on both sides.

FIG. 2 illustrates a fusible liner 1 having ridges. These ridges may be discontinuous ridges 3 or continuous ridges 4. The ridges may also be placed on both sides of the liner and should be relatively high in relation to their cross-section area.

The use of the fusible liner having protuberances is illustrated in FIG. 3. A substrate 5 is inserted into a heat recoverable sleeve 6 having an inner fusible liner 7 with protuberances 8 illustrated here as bumps. In this figure, the fusible liner is attached to recoverable sleeve 6 and the protuberances are preferably disposed toward substrate 5 as illustrated, although they could be on the sleeve side of the liner.

In FIG. 4, substrate 9 is covered with fusible liner in the form of a tube 10. This liner has protuberances 11 again illustrated as bumps. Recoverable sleeve 12 is then placed over fusible liner 10 and heat recovered. In this case, the protuberances are preferably disposed toward sleeve 12.

When either sleeve 6 or sleeve 12 is heat recovered, the sleeve may recover before enough heat has been applied to cause the fusible insert to flow. In that case, the protuberances will be visible on the outer surface of the sleeve. This condition is illustrated in FIG. 5. As can be seen, substrate 13 is covered by heat recoverable sleeve 14. Fusible liner 15 has not yet become flowable and as a result, the protuberances are visible on the outer surface of heat recoverable sleeve 14 at 16. When this condition exists, it can be seen and the workman applying the sleeve can thus readily determine either visually or by feel, that insufficient heat has been applied and that more heat should be applied until the outer surface of sleeve 14 is smooth, thus indicating that the fusible liner has reached a flowable condition.

FIG. 6 illustrates a method of preparing the fusible liner according to the present invention. A sheet of fusible material 17 is warmed and then pellets of fusible material 18 are sprinkled ont the surface to form protuberances 19. The pellets should be compatible with the material 17 so that they adhere when material 17 is warmed.

Protuberances can also be formed while using an engraved mandrel as illustrated in FIG. 7. A tube of heat recoverable material 20 is provided with an inner liner of fusible material 21. The tube is then placed over a mandrel 22 having embossed thereon grooves or indentations 23. The heat recoverable sleeve is then partially heat recovered over the mandrel. The heat causes the inner fusible sleeve to flow into the embossed indentations 23 thus forming protuberances on the inner surface of the liner 21. The sleeves 20 and 21 are then removed from the mandrel resulting in a heat recoverable tube 20 having an inner fusible liner with protuberances on the inner surface.

A method for forming protuberances in the form of ridges on the fusible liner is illustrated in FIG. 8. The heat recoverable tube is indicated generally at 24. It comprises outer heat recoverable sleeve 25 and inner fusible liner 26. The liner has protuberances in the form of ridges 27. These ridges are applied by spraying fusible material through spray head 28. The ridges 27 are formed helically by rotating tube 24 and at the same time moving it laterally. Alternatively, the spray head 28 can be rotated as tube 24 moved laterally.

In addition to the embodiments specifically disclosed in the figures above, it should be understood that this invention is applicable to any type of protuberance on the fusible liner and any method of forming such a protuberance. Thus, protuberances in any form may be employed, the only restriction being that the protuberances be discernible by sight or feel when the recoverable sleeve is recovered without causing the fusible layer to become flowable. Further, any method of forming the protuberances which is desired may be employed. Thus, the invention is limited only by the scope of the claims which follow.

We claim:

1. In combination, a heat recoverable sleeve, a substrate, said sleeve being positioned over said substrate for heat recovery into contact with said substrate, said sleeve having disposed adjacent to the inner surface of said sleeve a fusible liner comprising a fusible polymeric adhesive material having protuberances on at least one surface of said liner, said protuberances comprising a fusible material, said protuberances being of such size and shape that they form readily obvious bumps or ridges on the outer surface of the heat recoverable sleeve after it has recovered into contact with said substrate but insufficient heat has been added to cause the insert to flow and upon application of sufficient heat, said protuberances and fusible liner flow to form a complete bond between said sleeve and said substrate.

2. The recoverable sleeve of claim 1 wherein said sleeve has the property of elastic memory.

3. The recoverable sleeve of claim 1 wherein said sleeve is a crosslinked polymer.

4. A method of recovering a heat recoverable sleeve over a substrate comprising positioning the sleeve over a substrate, the inner diameter of said sleeve being larger than the outer diameter of the substrate, interposing a fusible insert between said sleeve and said substrate, said insert having protuberances on at least one surface, and applying heat to shrink said recoverable sleeve into contact with said substrate and to melt said insert to form a bond between said sleeve and said substrate, said protuberances on said insert operating as means visible through said sleeve to indicate when sufficient heat has been applied.

5. A method of claim 4 wherein said protuberances comprise a fusible material having substantially the same flow temperature as that of the liner and being of such size and shape that they form readily detectable bumps or ridges on the outer surface of the recoverable sleeve as it is being recovered.

6. The method of claim 4 wherein heat is applied to shrink said recoverable sleeve until bumps on the surface of the recoverable sleeve are observed and continuing the application of heat to said recoverable sleeve until bumps are no longer observed whereby said insert and said protuberances flow to form a complete bond between said sleeve and said substrate.

7. The method of claim 4 wherein said protuberances do not flow at the temperature at which the sleeve is recovered and upon recovery of the sleeve, said protuberances mechanically engage said substrate or said sleeve to improve the strength of the joint between the substrate and said sleeve.

8. In combination, a substrate, a heat recoverable sleeve adapted to be heat recovered into contact with a substrate, said sleeve being positioned over said substrate for heat recovery into contact with said substrate and a fusible liner disposed adjacent to the inner surface of said sleeve comprising a fusible material having protuberances on at least one surface of said liner whereby upon application of heat, said protuberances show through said sleeve as said sleeve is recovered into contact therewith and upon continued application of heat said liner melts to fuse said sleeve to said substrate.

9. The combination of claim 8 wherein said protuberances comprise a fusible material having substantially the same flow temperature as that of said liner, said protuberances being of such size and shape that they form readily detectable bumps or ridges on the outer surface of the heat recoverable sleeve after it has recovered into contact with a substrate.

10. The combination of claim 8 wherein said protuberances comprise a material which does not flow at the temperature of recovery of said recoverable sleeve whereby said protuberances mechanically engage the sleeve or substrate thereby improving the strength of the joint between said sleeve and said substrate.

* * * * *